United States Patent
Nir et al.

(10) Patent No.: US 6,285,316 B1
(45) Date of Patent: Sep. 4, 2001

(54) LOCATING A MOBILE UNIT USING SIGNALS FROM BOTH MOBILE BEACONS AND STATIONARY BEACONS

(75) Inventors: Joseph Nir, Rehovot; Baruch Shayevich, Rishon Lezion; Hanoch Cohen, Rishon Lezion; Oleg Perelmuter, Rishon Lezion, all of (IL)

(73) Assignee: Cellguide Ltd., Rehovot (IL)

( * ) Notice: Subject to any disclaimer, the term of this patent is extended or adjusted under 35 U.S.C. 154(b) by 0 days.

(21) Appl. No.: 09/585,622

(22) Filed: Jun. 2, 2000

(51) Int. Cl.[7] ........................................ G01S 5/02
(52) U.S. Cl. .................. 342/357.09; 342/357.05; 701/215
(58) Field of Search ............... 342/357.05, 357.09, 342/357.1; 701/215

(56) References Cited

U.S. PATENT DOCUMENTS

| | | |
|---|---|---|
| 5,365,450 | 11/1994 | Schuchman et al. . |
| 5,663,734 | 9/1997 | Krasner . |
| 5,774,829 | 6/1998 | Cisneros et al. . |
| 5,899,957 | * 5/1999 | Loomis ................... 701/214 |
| 5,982,324 | 11/1999 | Watters et al. . |
| 5,999,124 | 12/1999 | Sheyblat . |

FOREIGN PATENT DOCUMENTS

WO99/21028  10/1998  (WO) .
WO99/61934  5/1999  (WO) .

* cited by examiner

*Primary Examiner*—Theodore M. Blum
(74) *Attorney, Agent, or Firm*—Mark M. Friedman

(57) ABSTRACT

A method and system for finding the position of a mobile unit with respect to the satellites of a satellite network such as the Global Positioning System and with respect to the base stations of a wireless communications network. Each satellite transmits a signal that consists of a series of frames of a pseudonoise sequence. The frames of a signal received from the satellite network by the mobile unit are arranged as columns of a matrix and are processed coherently to provide estimated pseudoranges and estimated rates of change of pseudoranges for in view satellites. The coherent processing includes performing an orthogonal transform on the rows of the matrix, multiplying the elements of the matrix by Doppler compensation factors, and then, for each satellite in view, convolving the columns of the matrix with the pseudonoise sequence of that satellite. Other pseudoranges are inferred from synchronization burst sequences received by the mobile unit from one or more base stations. If the base stations are not mutually synchronized, reference units are provided to determine the time offsets between the base station clocks and the satellite network clock and to transmit these time offsets to the mobile unit, so that all the pseudoranges include the same bias relative to the satellite network clock. The pseudoranges are processed and reconciled by a dynamic estimator that includes a linear optimal estimator such as a Kalman filter, to produce successive estimates of the location of the mobile unit as the mobile unit moves.

55 Claims, 4 Drawing Sheets

LOCATING A MOBILE UNIT USING SIGNALS FROM BOTH MOBILE BEACONS AND STATIONARY BEACONS

FIELD AND BACKGROUND OF THE INVENTION

The present invention relates to positioning systems for portable radio transceivers, and, more particularly, to a positioning system for a mobile unit of a wireless communications network, based on signals from a satellite network such as the Global Positioning System (GPS) and on signals from the base stations of the wireless communications network.

The Global Positioning System is a system of low Earth orbit satellites that transmit standard signals that can be used to establish the location of a user equipped with a suitable GPS receiver. For civilian applications, the signals are "C/A codes" that are pseudorandom noise (PN) sequences transmitted at a chip rate of 1023 KHz and a repetition period of 1023 chips, so that each frame of the PN sequence includes 1023 chips. Each satellite is assigned its own PN sequence. and the PN sequences of the various satellites are mutually orthogonal.

Superposed on the PN sequences transmitted by a GPS satellite is a Satellite Data Message, transmitted every 30 seconds at a rate of 50 bits per second. Each bit (+1 or −1) of the Satellite Data Message is modulated onto the satellite's signal by multiplying 20 consecutive frames of the PN sequence by the bit. The first 900 bits of the Satellite Data Message includes the satellite ephemeris and time model for the respective satellite. The remaining 600 bits of the Satellite Data Message include a portion of the GPS almanac, which is a 15,000 bit block of coarse ephemeris and time model data for the entire GPS system. In addition, bits 1–8, bits 301–308, bits 601–608, bits 901–908 and bits 1201–1208 of every Satellite Data Message are identical 8-bit (160 millisecond) headers that are invariant in time and that are identical for all the GPS satellites; and bits 31–60, bits 331–360, bits 631–660, bits 931–960 and bits 1231–1260 of every Satellite Data Message are 30-bit (600 millisecond) handover words that are time-variant (these handover words include representations of the time of the week), but that, like the headers, are identical for all the GPS satellites.

Conventionally, a GPS receiver acquires and tracks the signals from at least four GPS satellites, by correlating the received signal with the satellites' respective PN sequences and locking on to the correlation peaks. Once the satellites are acquired and tracked, the GPS receiver decodes the ephemeris and time model, for each acquired satellite, from the respective Satellite Data Messages. These models include sufficient ephemeris data to enable the GPS receiver to compute the satellite's positions. The correlation peaks obtained during the continued tracking of the satellites provide measured times of arrival of these PN sequence frames. The differences between an arbitrary reference time and measured times of arrival, multiplied by the speed of light, are pseudoranges $\rho$ from the satellites to the GPS receiver. Typically, the reference time is the time at which the satellites commenced transmission of their respective PN sequences, as measured by the GPS receiver clock, which in general is offset from the GPS system clock by an unknown time offset. A pseudorange $\rho$ is related to the true range R of the respective satellite by $\rho = R + c_b$, where the range offset $c_b$ is the time offset. $T_0$, of the GPS receiver relative to GPS system time, multiplied by the speed of light c: $c_b = T_0 c$.

From these pseudoranges, and from the known positions of the satellites as functions of time, the position of the GPS receiver is calculated by triangulation. Pseudoranges to at least four satellites are needed to solve at least four simultaneous equations of the form $$|s-r| = \rho - c_b$$

where s is the position vector of a satellite and r=(x,y,z) is the position vector of the GPS receiver, for the three unknown Cartesian coordinates x, y, z of the GPS receiver and for $c_b$. The satellites are sufficiently far from the GPS receiver that these equations can be linearized in x, y and z with no loss of accuracy.

Several methods are known for increasing the efficiency with which a GPS receiver establishes its position and for reducing the power requirements of a GPS receiver. Schuchman et al., in U.S. Pat. No. 5,365,450, which is incorporated by reference for all purposes as if fully set forth herein, teach the provision of the Satellite Data Messages to a GPS receiver integrated into a mobile unit, such as a cellular telephone, of a wireless communications network such as a cellular telephone network, by transmitting the Satellite Data Messages to the mobile unit from a base station of the network via the control channel of the network. The Satellite Data Message is 30 seconds long, so even under ideal reception conditions with parallel processing of the signals from all the satellites in view, it necessarily takes more than 30 seconds to get a GPS position fix. Prior knowledge of the Satellite Data Message reduces this time to under 10 seconds.

Krasner, in U.S. Pat. No. 5,663,734, which is incorporated by reference for all purposes as if fully set forth herein, teaches a GPS receiver for a mobile unit in which, as in the GPS receiver of Schuchman et al., the Satellite Data Message is obtained by a wireless link to a base station, but then, instead of processing GPS signals in real time, the GPS receiver stores up to one second's worth of signals (1000 PN sequence frames per satellite), along with the initial time of arrival of the signals, and processes the stored signals. Groups of 5 to 10 frames each are summed and correlated with the PN sequences of satellites expected to be in view, and the resulting correlation functions are added incoherently. The summation over up to 1000 frames boosts the signal to noise ratio by a corresponding amount, and the post facto processing requires much less power than real time processing.

Duffet-Smith et al., in PCT Application WO 99/21028, which is incorporated by reference for all purposes as if fully set forth herein, teach a system and method for locating a mobile receiver ("remote unit") of a wireless communications network. The remote unit and a base unit at a fixed location both receive signals on a control channel from three or more base transceiver stations (BTSs), and both correlate invariant portions of the control channel signals. Compact descriptions of the correlation peaks, such as low order polynomial fits, are transmitted to a central processor by both the base unit and the remote unit. The central processor recovers, from the correlation peaks, the time offsets of the BTS transmissions to the base and remote units. These time offsets are the functional equivalents of GPS pseudoranges. Given the (fixed) locations of the BTSs and the base unit the central processor computes the position of the remote unit, essentially by triangulation, and transmits that location to the remote unit.

A GPS positioning system is predicated on the GPS receiver having a clear line of sight to at least four GPS satellites. This often is not the case in an urban environment.

Urban environments commonly have cellular telephone networks installed, so in principle the system taught by Duffet-Smith et al. could be used for locating a mobile transceiver configured as a cellular telephone; but cellular telephones generally are in simultaneous contact with at most two base stations. Sheynblatt, in U.S. Pat. No. 5,999,124, Camp, in PCT Application WO99/61934, and Watters et al., in U.S. Pat. No. 5,982,324, all teach methods of using signals from both GPS satellites and terrestrial BTSs to determine the location of a mobile receiver. These prior art methods generally rely on triangulation, as described above, using signals received simultaneously from a combined total of four or more GPS satellites and BTSs. As noted above, usually, at most two BTSs are "in view" simultaneously; and in a sufficiently cluttered and noisy urban environment, useable signals may be available from only one or two GPS satellites at any one time. These prior art methods also rely on all the BTSs being mutually synchronized, at least with each other if not with the GPS system. Such synchronization is optional under the GSM cellular standard. There is thus a widely recognized need for, and it would be highly advantageous to have, a system and method for locating a mobile unit of a wireless communications network, for example a mobile cellular telephone in a cluttered and noisy urban environment, that derives the location of the mobile unit from signals received sequentially from low Earth orbit satellites such as GPS satellites and from base stations of the communications network, without requiring that the BTSs be mutually synchronized.

SUMMARY OF THE INVENTION

According to the present invention there is provided a method for determining a pseudorange, and a rate of change thereof, to a beacon that transmits a signal including a plurality of blocks, each block including a plurality of frames of a pseudonoise sequence, each block being multiplied by a bit of a data sequence the signal being shifted relative to a nominal frequency by a frequency shift, the method including the steps of: (a) receiving the signal; (b) digitizing the received signal, thereby producing a digitized signal including a plurality of bits; (c) arranging the digitized signal as columns of an input matrix that includes a plurality of rows, each column including consecutive the bits of the digitized signal that correspond to an integral number of frames of the pseudonoise sequence; and (d) performing a discrete orthogonal transform on each row of the input matrix, thereby producing a transformed matrix.

According to the present invention there is provided a method for determining a pseudorange, and a rate of change thereof, to each of a plurality of beacons, each beacon transmitting a respective signal including a plurality of blocks, each block including a plurality of frames of a pseudonoise sequence, each block being multiplied by a bit of a data sequence, the pseudonoise sequences and the data sequences being uniquely associated with respective satellites, all the pseudonoise sequences being of equal length, the pseudonoise sequences being mutually orthogonal, the method including the steps of: (a) receiving the transmitted signals collectively as a received signal; (b) digitizing the received signal, thereby producing a digitized signal including a plurality of bits; and (c) for each beacon, multiplying groups of the bits of the digitized signal, that correspond to the blocks of the signal transmitted by the each beacon, by respective bits of the data sequence of the each beacon.

According to the present invention there is provided a receiver for receiving a signal transmitted by a beacon, the signal including a plurality of frames of a pseudonoise sequence, including: (a) an antenna for receiving the transmitted signal; (b) a mechanism for digitizing the received signal to produce a digitized signal including a plurality of bits; (c) a memory for storing the digitized signal as columns of a matrix that includes a plurality of rows, each column including consecutive the bits of the digitized signal that correspond to an integral number of frames of the pseudonoise sequence; and (d) a processor for performing a discrete orthogonal transform on each of the rows of the matrix.

According to the present invention there is provided a locator system for locating a mobile unit, including: (a) at least one beacon having a respective pseudonoise sequence and a respective data sequence, each data sequence including a plurality of bits, each at least one beacon operative to transmit a respective transmitted signal, each respective transmitted signal including a plurality of blocks, each block including a plurality of frames of the respective pseudonoise sequence, each block being multiplied by a bit of the respective data sequence, (b) a reference unit including: (i) a reference unit receiver for: (A) receiving the at least one transmitted signal as a reference unit received signal, and (B) recovering the at least one data sequence from the respective reference unit received signal, and (ii) a transmitter for transmitting the at least one data sequence to the at least one mobile unit; and (c) in the mobile unit: (i) a first mobile unit receiver for receiving the at least one data sequence, and (ii) a second mobile unit receiver including: (A) an antenna for receiving the at least one transmitted signal collectively as a mobile unit received signal, (B) a mechanism for digitizing the mobile unit received signal to produce a digitized signal including a plurality of bits, (C) a memory for storing, for each of the at least one beacon, an instance of the digitized signal, and (D) a processor for multiplying each of the at least one instance of the digitized signal by the bits of the respective data sequence.

According to the present invention there is provided a method for determining a location of a receiver, including the steps of: (a) providing a plurality of beacons having respective pseudonoise sequences, all the pseudonoise sequences being of equal length; (b) transmitting, by each beacon, a respective signal including a plurality of frames of the respective pseudonoise sequence; (c) receiving the transmitted signals collectively as a received signal, by the receiver; (d) inferring, for each beacon, a pseudorange and a rate of change of the pseudorange; and (e) inferring the location of the receiver from the pseudoranges and from the rates of change of the pseudoranges.

According to the present invention there is provided a method for determining a pseudorange, and a rate of change thereof, to a beacon that transmits a signal including a plurality of blocks, each block including a plurality of frames of a pseudonoise sequence, each block being multiplied by a bit of a data sequence, the signal being shifted relative to a nominal frequency by a Doppler frequency shift, the method including the steps of: (a) receiving the signal; (b) digitizing the received signal, thereby producing a digitized signal including a plurality of bits; and (c) applying a matched filter algorithm to the digitized signal to extract therefrom the pseudorange and the rate of change of the pseudorange, the matched filter algorithm including: (i) demodulating the digitized signal relative to the data sequence.

According to the present invention there is provided a method for locating a mobile unit, including the steps of: (a) providing a plurality of asynchronous stationary beacons, each stationary beacon transmitting a respective stationary beacon signal: (b) providing a plurality of mobile beacons moving on known respective trajectories, each mobile beacon transmitting a respective mobile beacon signal, all the mobile beacons being mutually synchronized; (c) for each of at least one of the stationary beacons: (i) receiving the respective stationary beacon signal, by the mobile unit, and (ii) inferring, from the respective stationary beacon signal, at least one parameter related to a range to the each stationary beacon; (d) for each of at least one of the mobile beacons: (i) receiving the respective mobile beacon signal, by the mobile unit, and (ii) inferring, from the respective mobile beacon signal, at least one parameter related to a range to the each mobile beacon; (e) synchronizing the mobile unit and the stationary beacons to the mobile beacons by steps including: (i) providing, for each stationary beacon, a reference unit for measuring time offsets between the mobile beacons and the each stationary beacon, (ii) measuring the time offsets, by the reference units, and (iii) transmitting at least one the time offset from a respective the reference unit to the mobile unit, the inferring of the parameters being based on the synchronization; and (f) inferring, from the parameters, a location of the mobile unit.

According to the present invention there is provided a method for tracking a mobile unit, including the steps of: (a) providing a plurality of beacons, each beacon transmitting a respective ranging signal; (b) obtaining an initial estimate of a location of the mobile unit; (c) receiving, by the mobile unit, one of the ranging signals; (d) inferring, from the ranging signal, at least one parameter related to a range to the beacon that transmitted the ranging signal; and (e) obtaining an updated estimate of the location of the mobile unit, based on an initial state estimate that includes the initial estimate of the location and on an update measurement that includes the at least one parameter.

According to the present invention there is provided a locator system for locating a mobile unit, including: (a) a plurality of asynchronous stationary beacons, each stationary beacon being operative to transmit a respective stationary beacon signal; (b) a plurality of mobile beacons, each mobile beacon operative to transmit a respective mobile beacon signal while moving on a known respective trajectory, all the mobile beacons being mutually synchronized; and (c) in the mobile unit: (i) a mobile unit clock for producing a mobile unit timing signal; (ii) a first mobile unit receiver for receiving and digitizing the stationary beacon signals; (iii) a second mobile unit receiver for receiving and digitizing the mobile beacon signals, thereby producing corresponding digitized mobile beacon signal; (iv) a memory for storing the digitized mobile beacon signal; (v) a mobile unit processor for transforming each of the stationary beacon signals into a corresponding stationary beacon pseudorange, and for transforming each of the digitized mobile beacon signals into a corresponding mobile beacon pseudorange subsequent to the storing of the each digitized mobile beacon signal in the memory; and (d) at least one reference unit including: (i) a first reference receiver for receiving the mobile beacon signals and inferring therefrom a common start time of the mobile beacon signals, (ii) a second reference unit receiver for receiving at least one of the stationary beacon signals from at least one respective the stationary beacon, (iii) a reference unit clock for producing a reference unit timing signal, (iv) a reference unit processor for inferring, for each at least one respective stationary beacon, a timing offset between a start time of the at least one respective stationary beacon signal and the common start time of the mobile beacon signals; and (iii) a transmitter for transmitting the at least one timing offset; the first mobile unit receiver being operative to receive the at least one timing offset from each at least one reference unit transmitter; the pseudoranges being with reference to both the mobile unit timing signal and the at least one timing offset.

According to the present invention there is provided a locator system for locating a mobile unit, including: (a) a plurality of beacons, each beacon transmitting a respective ranging signal; and (b) in the mobile unit: (i) a mechanism for obtaining an initial estimate of a location of the mobile unit, (ii) a receiver for receiving the ranging signals, (iii) a processor for inferring, from one of the ranging signal, at least one parameter related to a range to the beacon that transmitted the ranging signal, and (iv) an updating mechanism for updating the location estimate, based on an update to measurement that includes the at least one parameter.

According to the present invention there is provided a method for tracking a mobile unit, including the steps of: (a) providing a plurality of mobile beacons, each mobile beacon transmitting a respective ranging signal; (b) providing a plurality of stationary beacons, each stationary beacon transmitting a respective ranging signal; (c) obtaining an initial estimate of a location of the mobile unit; (d) receiving, by the mobile unit, a first ranging signal from a respective beacon of one of the pluralities of beacons; (e) inferring, from the first ranging signal, at least one parameter related to a range to the beacon that transmitted the first ranging signal; (f) obtaining a first updated estimate of the location of the mobile unit, based on the initial location and on the at least one parameter that is related to the range to the beacon that transmitted the first ranging signal; (g) receiving, by the mobile unit, a second ranging signal from a respective beacon of another of the pluralities of beacons; (h) inferring, from the second ranging signal, at least one parameter related to a range to the beacon that transmitted the second ranging signal; and (i) obtaining a second updated estimate of the location of the mobile unit, based on the first updated location and on the at least one parameter that is related to the range to the beacon that transmitted the second ranging signal.

According to the present invention there is provided a locator system for locating a mobile unit, including: (a) a plurality of mobile beacons, each mobile beacon transmitting a respective ranging signal; (b) a plurality of stationary beacons, each stationary beacon transmitting a respective ranging signal; and (c) in the mobile unit: (i) a mechanism for obtaining an initial estimate of a location of the mobile unit, (ii) a receiver for receiving the ranging signals, (iii) a processor for inferring, from each of the ranging signals, at least one parameter related to a range to the beacon that transmitted the ranging signal, and (iv) an updating mechanism for updating the initial location estimate, using the at least one parameter that is related to the range to a beacon of one of the pluralities of beacons, thereby providing a first updated estimate of the location of the mobile unit, and for updating the first updated estimate, using the at least one parameter that is related to the range to a beacon of another of the pluralities of beacons.

In the broadest sense, the present invention includes methods and systems that enable a mobile unit to determine its location by appropriate processing of signals received from mobile beacons and stationary beacons. As understood herein, a beacon is a device that includes a transmitter that transmits a signal, typically a radio frequency signal, that the mobile unit receives and then uses to determine its own location. Some of the beacons are stationary, meaning that these beacons are in fixed and known locations. Other beacons are mobile, meaning that these beacons move along known trajectories, such that at any time, the instantaneous locations of the relevant mobile beacons are known. Typically, the mobile unit is a cellular telephone, the stationary beacons are base transceiver stations of a cellular telephone network, and the mobile beacons are satellites of a low-Earth-orbit-satellite-based positioning system such as the GPS system and the Russian GLONASS system, the trajectories of the mobile beacons then being the orbits of the satellites, as described by the satellite ephemeris and time models. More generally, however, the scope of the present invention includes any suitable beacons. For example, the stationary beacons may be special purpose beacons set up specifically to enable the tracking of a mobile unit, and the mobile beacons may be aircraft flying along known trajectories.

Although the scope of the present invention extends to the use of any suitable types of mobile and stationary beacons, the present invention is described herein in terms of the preferred and most typical mobile and stationary beacons: GPS satellites and base stations (BTSs) of a cellular telephone network. It will be clear to those skilled in the art how to adapt the principles of the present invention to other types of mobile and stationary beacons.

The mobile unit receives ranging signals from the mobile and stationary beacons. In the case of the mobile beacons being GPS satellites, the ranging signals are successive PN frames, modulated by the Satellite Data Messages. In the case of the stationary beacons being BTSs, the ranging signals are synchronization burst sequences transmitted in the cellular network control channel.

In order for these signals to be interpreted correctly by the mobile unit, if the cellular telephone network is asynchronous, with the BTSs being synchronized neither to the GPS network nor to each other, then the time offsets between the individual BTSs and the GPS system must be known by the mobile unit. Therefore, at least one reference unit is provided, for determining offsets between the BTSs and GPS time. One reference unit is associated with one or more BTSs. Each reference unit includes a GPS-based time reference module for receiving the PN frames from the GPS satellites and cross-correlating them with local copies of the PN sequences to determine GPS time, a cellular communications module for receiving the synchronization burst sequences from the associated BTSs, and a synchronization module for determining the timing offsets of the associated BTSs relative to GPS time. The cellular telephone network is provided with a locator service center, and the reference units transmit the timing offsets to the mobile unit via the locator service center. Optionally, one of the reference units is designated as a master reference unit that also transmits the Satellite Data Messages to the mobile unit via the locator service center. (This master reference unit may be physically integrated with the locator service center.) The mobile unit is synchronized to the cellular network in the conventional manner. This allows the mobile unit to also be synchronized approximately to the GPS network: having received the BTS timing offsets from the reference units via the locator service center, the mobile unit computes the time offset between its own clock and GPS time to within about 30 microseconds.

The mobile unit receives the satellite ranging signals collectively from the GPS satellites that are in view, digitizes the combined signal, and applies matched filter algorithms to the combined signal to extract pseudoranges and rates of change of pseudoranges from the combined signal, as follows. Successive frames of the digitized combined signal are arranged as columns of a matrix. As many instances of the matrix are formed as there are satellites in view. That the mobile unit is approximately synchronized with the GPS network allows each matrix instance to be demodulated, with respect to the Satellite Data Message of the corresponding satellite, by multiplying groups of columns of the matrix instance by corresponding bits of the Satellite Data Message of the corresponding satellites. If a master reference unit is provided, then any PN frames may be used to form the instances of the matrix; otherwise, only those PN frames, that correspond to bits of the Satellite Data Messages that are common to all satellites, are used. The rows of the matrices are transformed using a discrete orthogonal transform, preferably a discrete Fourier transform. The elements of the matrices are multiplied by respective Doppler compensation factors. The columns of the matrices are convolved with the PN sequences of the in-view satellites to provide, for each in-view satellite, a signal ambiguity function matrix. The squared magnitudes of the elements of these matrices include local peaks, the row and column coordinates of which correspond to candidate hypotheses for the pseudoranges to the corresponding satellites and to the rates of change of these pseudoranges. This procedure is repeated several times to provide several signal ambiguity function matrices for each in-view satellite. Then, for each in-view satellite, the best hypothesis is chosen, for example, by integrating the matrices noncoherently and then identifying the most likely peak in the sum; or by passing the coordinates of all the peaks of the matrices to a "track before detect" algorithm. In either case, the peaks are identified using a constant false alarm rate detection scheme.

The pseudoranges to stationary beacons are simply the differences between the measured times of arrival of the synchronization burst sequences and the transmission times of the synchronization burst sequences according to the GPS system clock, multiplied by the speed of light. Note that, because the mobile unit has received the time offsets between the BTS clocks and the GPS system clock, from the reference units via the locator service center, the mobile unit can refer these transmission times to the GPS system clock. Note also that, as a consequence, the pseudoranges to the BTSs are with reference to the same range offset, $c_b$, as applies to the GPS satellites. As each stationary beacon pseudorange is acquired by the mobile unit, and as each mobile beacon pseudorange—pseudorange rate pair is acquired by the mobile unit, these data are input as update measurements to a dynamic estimator to produce an updated estimate of the location of the mobile unit. Preferably, the dynamic estimator is based on a linear optimal estimator, such as a Kalman filter. The dynamic estimator requires an initial estimate of the location of the mobile unit. This initial estimate is obtained by triangulation. Alternatively, under certain conditions, the location of a predefined reference point, such as the nearest stationary beacon, may be used as the initial estimate of the mobile unit's location.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for locating a mobile unit, for example a mobile unit of a wireless communications system, based on ranging signals, both from mobile beacons such as GPS satellites and from stationary beacons such as base stations of the wireless communications system. Specifically, the present invention can be used to locate a suitably equipped cellular telephone in an environment, such as an urban environment, in which it is difficult to establish simultaneous lines of sight to four or more GPS satellites.

Although the present invention is described herein in reference to the GPS system and a cellular telephony network, it will be appreciated that this description is purely illustrative, and that the scope of the present invention extends to the use of any suitable types of mobile and stationary beacons, as defined above.

The principles and operation of a locator system and method according to the present invention may be better understood with reference to the drawings and the accompanying description.

Figure 1:
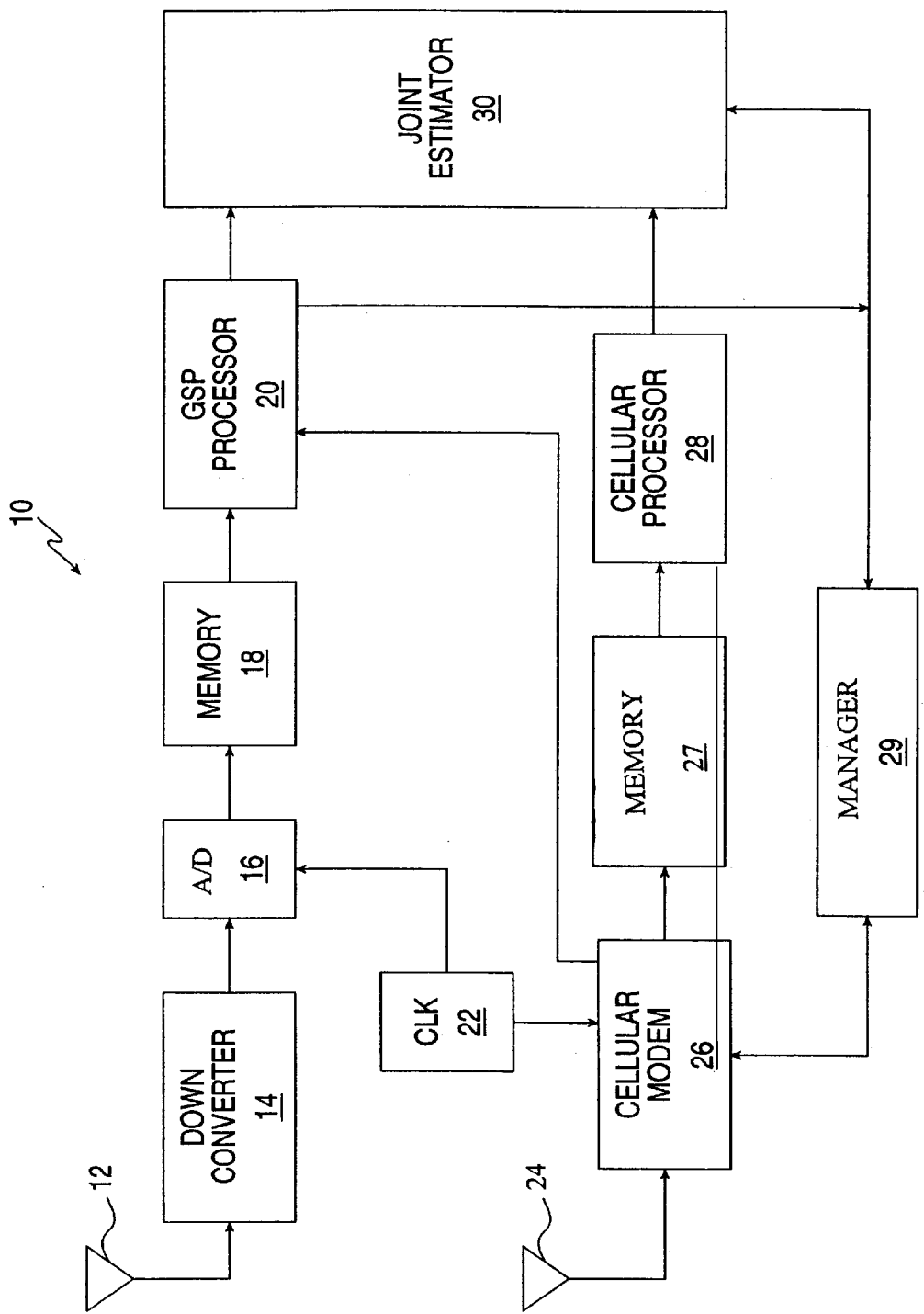
FIG. 1 is a block diagram of a mobile unit of the present invention.

Referring now to the drawings. FIG. 1 is a partial high level block diagram of a mobile unit 10 of the present invention. Mobile unit 10 includes an antenna 12 for receiving RF signals transmitted by GPS satellites, a downconverter 14 for downconverting the RF signals received from the GPS satellites to an intermediate frequency (IF), a digitizer 16 for digitizing the IF signals, a clock 22 for providing local timing signals, a memory 18 for storing the digitized GPS signals, and a GPS processor 20 for processing the signals stored in memory 18. Mobile unit 10 also includes an antenna 24 for exchanging RF signals with BTSs of a cellular telephone network, a cellular modem 26 for downconverting and digitizing the control channel RF signals received from the BTSs, a memory 27 for storing the digitized BTS signals, and a cellular processor 28 for processing the digitized BTS signals with reference to timing signals from clock 22, as described below. The outputs of GPS processor 20 and cellular processor 28 are reconciled in a joint estimator 30, as described below, to produce a joint estimate of the location of the mobile unit of which mobile unit 10 is a part. GPS processor 20, cellular processor 28 and joint estimator 30 function under the overall supervision of a management unit 29. In particular, management unit 29 formulates requests for supplemental data, and, using cellular modem 26 and antenna 24, transmits these requests as RF signals to the BTSs, as described below.

Figure 2:
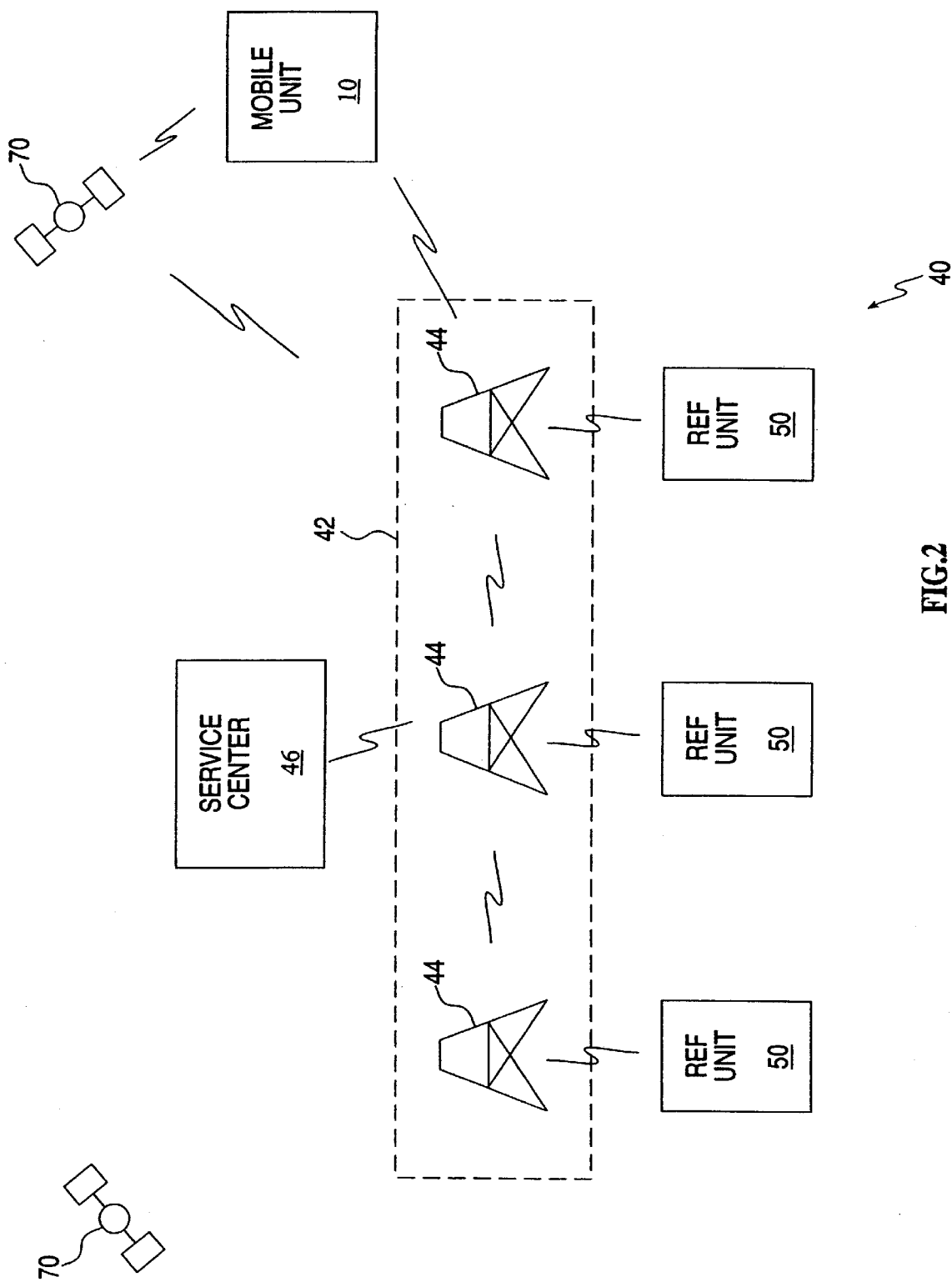
FIG. 2 is a schematic diagram of a locator system of the present invention.

FIG. 2 is a schematic diagram of a locator system 40 of the present invention. Locator system 40 is based on a conventional cellular telephone network 42 that includes multiple BTSs 44, and on the GPS system, represented in FIG. 2 by satellites 70. The terrestrial component of locator system 40 adds to cellular telephone network 42 a locator service center 46 and a multitude of reference units 50, at fixed and known locations. Each reference unit 50 is associated with one or more BTSs 44, and communicates with those BTSs 44 and, via the nearest of those BTSs 44, with service center 46. Mobile unit 10, using antenna 24 and cellular modem 26, also receives messages from service center 46 via the nearest BTS 44, as described below.

Figure 3:
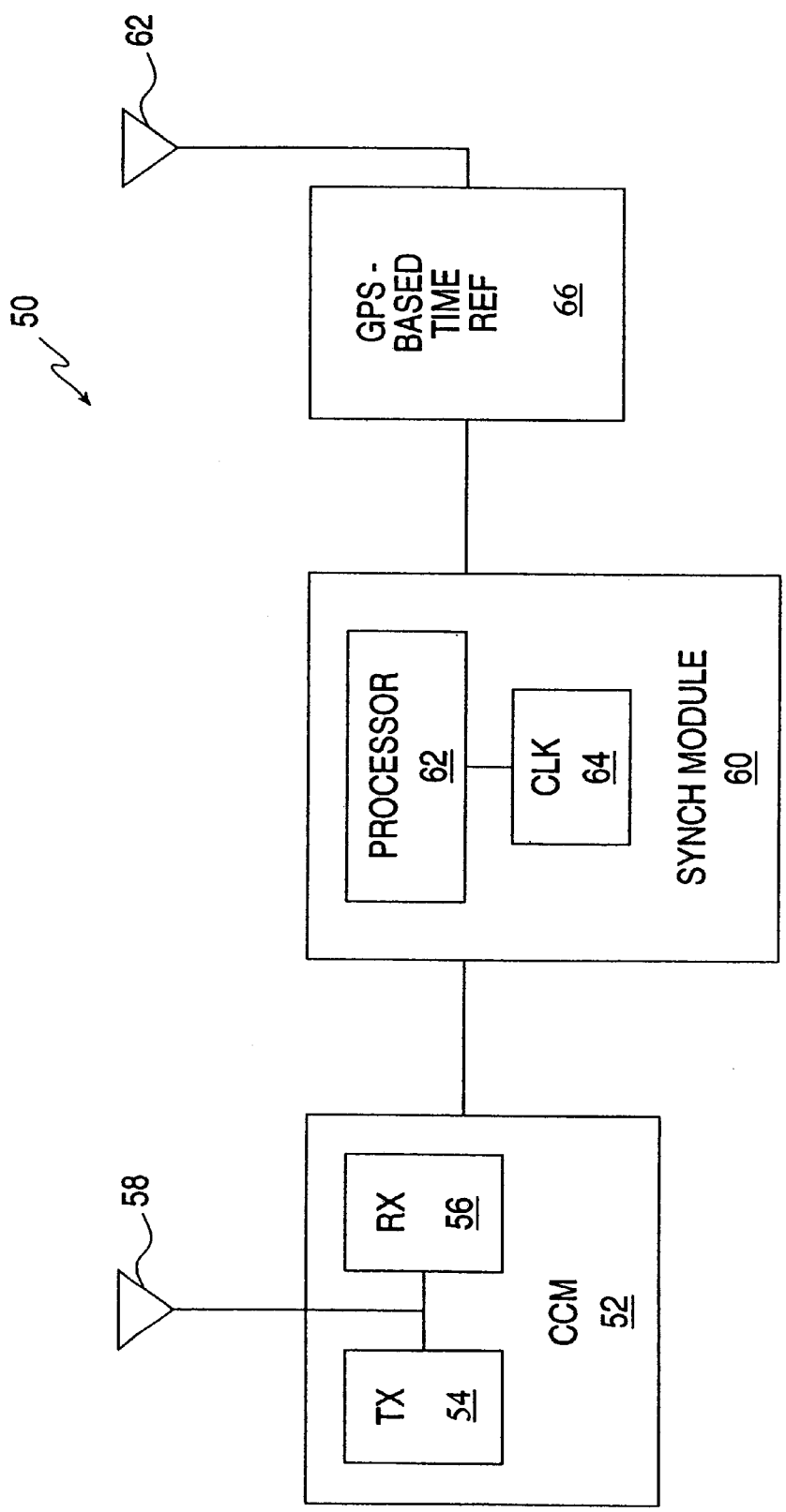
FIG. 3 is a block diagram of a reference unit of the present invention.

FIG. 3 is a high level block diagram of reference unit 50. Reference unit 50 includes a cellular communications module (CCM) 52 for communicating with service center 46 via cellular network 42, a GPS-based time reference module 66, and a synchronization module 60 for synchronizing, CCM 52 to GPS-based time reference module 66 as described below. CCM 52 includes both transmission functionality 54 and reception functionality 56, via an antenna 58. GPS-based time reference module 66 receives GPS satellite signals via an antenna 68. Synchronization module 60 includes both a clock 64 for providing reference timing signals and a processor 62 for establishing timing offsets between the GPS system and the BTSs 44 that are associated with reference unit 50, as described below. The main function of each reference unit 50 is to determine these timing offsets and to transmit these timing offset to locator service center 46. Optionally, one of reference units 50 is designated as a master reference unit. The master reference unit has the additional function of receiving the Satellite Data Messaces from satellites 70 and transmitting these Satellite Data Messages to locator service center 46.

Locator service center 46 is a node of cellular telephone network 42 whose function is to coordinate communications between mobile unit 10 and cellular telephone network 42 that relate to the self-location functionality of mobile unit 10. In particular, locator service center 46, upon receipt of a query from mobile unit 10, transmits to mobile unit 10 supplemental data such as the timing offsets between the GPS system and one or more BTSs 44 and optionally the Satellite Data Messages of in-view satellites 70. Optionally, the functionality of joint estimator 30 may reside in location service center 46, with the outputs of GPS processor 20 and cellular processor 28 being transmitted to location service center 46 for reconciliation.

The signal received by mobile unit 10 from the GPS system, as a function of time t, is a sum of the signals G(t) transmitted by GPS satellites 70 that are in view at time t. The signal received by mobile unit 10 from any one satellite 70, indexed by an index j, is in the form $$G_j(t) = K_j D_j(t-\tau_j) g_j(t-\tau_j) \exp[i\omega(t-\tau_j)]$$

where i is the square root of −1; $\tau_j$ is the true one-way propagation time of radio waves from the satellite to mobile unit 10; $K_j$ is an amplitude factor that depends on the true range $R_j = c\tau_j$ to satellite j at time t, and on the GPS antenna gain pattern; $D_j(t-\tau_j)$ is the Satellite Data Message of satellite j at time $t-\tau_j$; $g_j(t-\tau_j)$ is the PN sequence of satellite j at time $t-\tau_j$; and $\exp[i\omega(t-\tau_j)]$ is a Doppler factor whose Doppler frequency ω depends on the radial component of the velocity of satellite j relative to mobile unit 10, on the bias of clock 22, and on other imperfections in mobile unit 10. The total signal G(t) received by mobile unit 10 is the sum of these signals, $$\sum_j G_j(t).$$

The object of the processing in GPS processor 20 is to measure $\rho_j = R_j + c_b$, and its rate of change $d\rho_j/dt$ for all the satellites in view. Note that all the pseudoranges $\rho_j$ are referred to the same range offset $c_b$. As in the prior art methods, $c_b$ is one of the unknowns that is solved for subsequently to determine the location of mobile unit 10, so it is not necessary to measure $\tau_j$ explicitly.

As in U.S. Pat. No. 5,663,734, several hundred seconds worth of a digitized total GPS signal is stored in memory 18 and then processed by GPS processor 20. One difference between U.S. Pat. No. 5,663,734, and the GPS processing of the present invention is that according to the present invention, groups of many more than 5 to 10 PN sequence frames are processed coherently.

The total signal received by mobile unit 10 is oversampled by digitizer 16, starting at an initial reception time $t_0$, typically at a sampling rate of between two and four samples per chip. With four samples per chip, there are a total of 4×1023=4092 samples per frame. For each in-view satellite 70, indexed by index j, these samples are stored as successive columns of a matrix $M_{Ij}$ that, in the case of a sampling rate of four samples per chip, has 4092 rows and as many columns as the number of consecutive frames included in the computation: the first column of $M_{Ij}$, matrix elements $M_{Ij}(1,1)$ through $M_{Ij}(4092,1)$ are the first 4092 samples, corresponding to the first millisecond's worth of data, the second column of $M_{Ij}$, matrix elements $M_{Ij}(1,2)$ through $M_{Ij}(4092,2)$, are the second 4092 samples, corresponding to the second millisecond's worth of data; etc., through a number of columns n equal to the number of frames of data that are stored in memory 18, at one millisecond per frame. Preferably, between 100 milliseconds and 1000 milliseconds worth of data (100 to 1000 frames) are stored in memory 18 as matrix $M_{Ij}$ for each in-view satellite 70.

The first processing step is to demodulate each matrix $M_{Ij}$, i.e., to remove the influence of Satellite Data Message $D_j$. This is done by multiplying groups of columns of $M_{Ij}$ by the corresponding bits of $D_j(t-\tau_j)$. A necessary prerequisite for this demodulation is for the bits of $D_j$ to be aligned with the columns of $M_{Ij}$ to within about one millisecond. This alignment is referred to herein as "approximate synchronization" of mobile unit 10 with the GPS system.

Cellular telephone network 42 may be synchronized to the GPS system clock in any case, for example, if cellular telephone network operates according to the CDMA IS-95 standard. Mobile unit 10 is synchronized to cellular telephone network 42 in the conventional manner. Because cellular telephone network 42 is time-aligned (synchronized) with GPS system time, mobile unit 10 also is synchronized to GPS system time and therefore is able to demodulate matrix $M_{Ij}$ relative to Satellite Data Message $D_j$.

If cellular telephone network 42 is not synchronized to the GPS system clock, and, in particular, if BTSs 44 are not synchronized to each other, mobile unit 10 nevertheless can obtain, from reference units 50 via locator service center 46, the transmission times of the synchronization burst sequences of BTSs 44 according to the GPS clock. When CCM 52 of a reference unit 50 receives a synchronization burst sequence from one of the BTSs 44 associated with reference unit 50, synchronization module 60 determines the time offset between that BTS 44 and the GPS system with reference to clock 64. Because the locations of reference unit 50 and the associated BTSs 44 are fixed and known, the propagation time from each associated BTS 44 to reference unit 50 also is known, so the time offset is referred to the time at which that BTS 44 transmitted the synchronization burst sequence, and not the time at which reference unit 50 received the synchronization burst sequence. CCM 52 then transmits this time offset to locator service center 46. This is done for the synchronization burst sequence of each associated BTS 44, so that locator service center 46 always has a current list of time offsets of all BTSs 44 from the GPS system. Finally, mobile unit 10 receives the current time offsets of the relevant BTSs 44 from locator service center 46 on request. The time offset of the nearest BTS 44 from the GPS system is used by mobile unit 10 to correct the nominal transmission times of the synchronization burst sequences from the nearest BTS 44 for this offset, and so to obtain an estimate of its own time offset $T_0$ from GPS system time to within 30 microseconds. The time offsets of BTSs 44 from the GPS system also are used to obtain BTS pseudoranges that are referred to range offset $c_b$, as described below.

If the frames that are used to construct matrix $M_{Ij}$ correspond to Satellite Data Message header bits or to Satellite Data Message handover word bits, which are common to the Satellite Data Messages of all satellites 70, then mobile unit 10 either knows these bits a priori (in the case of header bits) or computes these bits based on the time of the week (in the case of handover word bits). In the embodiment of the present invention in which a master reference unit is designated to receive the Satellite Data Messages and relay these Satellite Data Messages to locator service center 46, mobile unit 10 sends a request to locator service center 46 to obtain Satellite Data Message $D_j$ so that the satellite-dependent bits of Satellite Data Message $D_j$ can be used to demodulate matrix $M_{Ij}$.

The second processing step is to transform each matrix $M_{Ij}$ into a matrix $M_{IIj}$ by performing a discrete orthogonal transform on each of the rows of matrix $M_{Ij}$, thereby transforming the rows from the time domain to the frequency domain, so that matrices $M_{IIj}$ are in a mixed time-frequency domain. The most preferred discrete orthogonal transform is the discrete Fourier transform, although the scope of the present invention includes other transforms, such as the Walsh-Hadamard transform, the various kinds of Wavelet transforms and the Hartley transform.

The third processing step is the multiplication of the elements of each matrix $M_{IIj}$ by Doppler compensation factors. The form of the Doppler compensation factor for the (r,d) element of matrix $$M_{IIj} \text{ is } \exp\left(-\frac{2\pi i r}{m}\left(\frac{d}{n}+h\right)\right),$$

where m is the number of rows in matrix $M_{IIj}$, n is the number of columns in matrix $M_{IIj}$ and h is the integer part of the Doppler frequency shift of the signal $G_j(t)$, measured in KHz. Note that, with one one-millisecond PN frame per column of matrix $M_{Ij}$, each row of matrix $M_{IIj}$ spans one KHz. Initially, the true Doppler frequency shift of each satellite 70 can be estimated by mobile unit 10 to within about 4 KHz. Therefore, four different sets of Doppler compensation factors are needed, resulting in four different matrices $M_{IIj}$ for each satellite j. Subsequently, as described below, much more accurate estimates of the Doppler frequency shifts of satellites 70 are obtained, and only one matrix $M_{IIj}$ is needed per satellites j. For clarity, the remaining discussion of how GPS pseudoranges and pseudorange rates of change are measured according to the present invention is in terms of a single matrix $M_{IIj}$ per satellite j.

The fourth processing step is to convolve each of the columns of each matrix $M_{IIj}$ with the PN sequence of satellite j, to produce a matrix $M_j$ that is equivalent to the matched filter, in range and frequency, known in the field of radar signal processing as the "signal ambiguity function". See, for example. Fred E. Nathanson, *Radar Design Principles, Second Edition* (McGraw-Hill, 1991). It is this use of demodulated signal ambiguity functions, subsequent to approximate synchronization of mobile unit 10 to the GPS system, that enables the present invention to process coherently many more than the 5 to 10 PN sequence frames that are processed coherently by Krasner in U.S. Pat. No. 5,663,734. The preferred convolution method is the well-known fast convolution method, also used by Krasner in U.S. Pat. No. 5,663,734: perform a discrete Fourier transform on a column of matrix $M_{IIj}$, multiply the transformed column by the discrete Fourier transform of the PN sequence, and invert the discrete Fourier transform of the column. Note that the multiplication of the elements of matrix $M_{Ij}$ by the satellite-dependent parts of the Doppler compensation factors, $$\exp\left(-\frac{2\pi irh}{m}\right),$$

may be deferred to this processing step and implemented by, for each transformed column of $M_{Ij}$, appropriately shifting the discrete Fourier transform of the PN sequence prior to the multiplication of the transformed column by the discrete Fourier transform of the PN sequence. Note also that the matrix elements of $M_j$ are complex. The overall appearance of matrix $M_j$, in terms of the squared magnitudes of its elements, is a set of peaks above a general background level. The row coordinate of a peak is its pseudorange (units of distance) and the column coordinate (units of frequency) of a peak is proportional to the rate of change of its pseudorange (units of velocity).

Although the preferred structure of matrix $M_{Ij}$ has one frame per column. it also is possible to construct matrix $M_{Ij}$ with more than one frame per column, as long as an integral number of frames are used per column. Using one frame per column gives the optimal resolution for determining the rates of change of the pseudoranges.

A constant false alarm rate detection scheme is used to identify the peaks. Preferably, the detection scheme is based on an adaptive threshold, based on a background level that is obtained, matrix element by matrix element, by averaging the squared magnitudes of all the matrix elements in a window (for example, an 8×8 window or a 16×16 window) around the target matrix element. The set of matrix elements. whose squared magnitudes exceed their local average by a threshold factor. is in the form of isolated clusters of matrix elements, with each cluster corresponding to one peak. The coordinates of the peaks are the centroids of the clusters, weighted by the magnitudes of the matrix elements in the clusters. The threshold factor is determined by the required maximum false alarm rate, as is well-known in the art.

The output of this procedure is a set of hypotheses for the pseudorange pf and its rate of change $d\rho_j/dt$ associated with the initial reception time $t_0$. At this point. the hypothesis associated with the peak most likely to be the most reliable measure of $\rho_j$ and $d\rho_j/dt$, for example. the highest peak. could be selected to provide the coordinates that determine $\rho_j$ and $d\rho_j/dt$. Preferably. however. several instances of the matrices $M_j$, based on several successive instances of the digitized total GPS signal, are generated. Preferably, between five and ten such instances of each matrix $M_j$ are so generated. Subsequent processing is directed towards obtaining, for satellites, values of $\rho_j$ and $d\rho_j/dt$ that are based on all the instances of $M_j$ processed collectively.

One method of processing the instances of $M_j$ collectively is to integrate them noncoherently. In standard noncoherent integration, the matrix elements of all the instances are replaced by their squared magnitudes; the instances arc added to each other, matrix element by matrix element, to produce a sum matrix; the false alarm detection scheme described above is used to identify the peaks of the sum matrix; and the coordinates of the peak most likely to be the most reliable measure of $\rho_j$ and $d\rho_j/dt$, for example, the highest peak, are taken as the values of $\rho_j$ and $d\rho_j/dt$. In binary noncoherent integration, the matrix elements of all the instances are replaced by their squared magnitudes, but then the constant false alarm detection scheme is used to compare each matrix element with a threshold. Matrix elements that exceed the threshold are replaced by ones. and all other matrix elements are replaced by zeros. The instances now are added to each other, matrix element by matrix element, to produce a sum matrix. and a second threshold is applied to the sum matrix to identify its peaks. Again, the coordinates of the peak, of the sum matrix, that is most likely to represent the most reliable measure of $\rho_j$ and $d\rho_j/bt$, are used as the values of $\rho_j$ and $d\rho_j/dt$.

Another way to obtain values of $\rho_j$ and $d\rho_j/dt$ that are based on all the instances of Mj processed collectively is to replace the matrix elements of all the instances with their squared magnitudes. as in noncoherent integration, but then to apply the constant false alarm rate detection scheme separately to each instance, to obtain, for each instance, a set of hypotheses for $\rho_j$ and $d\rho_j/dt$. These hypotheses and their associated start times are input to a "track before detect" identification scheme to identify the most likely hypothesis. "Track before detect" is a method that is well known in radar technology for identifying targets in a low signal-to-noise environment. See, for example, the book by Fred E. Nathanson cited above.

The pseudoranges to BTSs 44 are the differences between the measured times of arrival of the synchronization burst sequences and the nominal transmission times of the synchronization burst sequences according to the GPS system clock. If cellular telephone network 42 is synchronized to the GPS system clock, then the nominal transmission times of the synchronization burst sequences, according to clock 22, are offset from their true times by the same time offset, $T_0$, as the time offset by which the nominal transmission times of the PN sequences by satellites 70, according to clock 22, are offset from their true times. As a result, all the pseudoranges. both to satellites 70 and to BTSs 44, share the same range offset $c_b$. If cellular telephone network 42 is not synchronized to the GPS system clock. then mobile unit 10 obtains the time offsets of BTSs 44 from the GPS system from locator service center 46, as described above in the context of the approximate synchronization of mobile unit 10 with the GPS system for the purpose of demodulation. Mobile unit 10 then uses these time offsets to correct the times of arrival of the synchronization burst sequences from BTSs 44, as measured by clock 22, so that the pseudoranges to BTSs 44 are referred to the same range offset ch as the pseudoranges to satellites 70. The pseudoranges to the in-view satellites 70, the rates of change of the pseudoranges to the in-view satellites 70, and the pseudoranges to BTSs 44 are input to joint estimator 30.

The method used by joint estimator 30 to combine pseudoranges ρ and pseudorange rates of change dρ/dt from GPS processor 20, and estimated pseudoranges ρ from cellular processor 28 to derive the location of mobile unit 10 now will be discussed. The essence of this method is to use each new measurement (a pseudorange ρ and pseudorange rate of change dρ/dt relative to a particular satellite 70 or a pseudorange ρ relative to a particular BTS 44), as that measurement is obtained, to update an a prioiri estimate of the location vector $r=(x,y,z)^T$ and of the velocity vector $v=(v_x, v_y, v_z)^T$ of mobile unit 10. (It is for this reason that this measurement is referred to herein as an "update measurement".) If mobile unit 10 were to remain stationary between successive measurements and if range offset $c_b$ were to remain constant between successive measurements, or if four or more measurements were to be obtained from matrices $M_j$ computed from signals received simultaneously by mobile unit 10 from the GPS system, it would be possible to fix the location of mobile unit 10 by triangulation. Because mobile unit 10 moves and $c_b$ may drift between successive measurements, if measurements obtained from GPS signals received by mobile unit 10 at different times are to be used, or if pseudoranges to BTSs 44 are to be used, a method of estimating r that accounts for the motion of mobile unit 10 and for the drift of clock 22 must be used. Such a method is referred to herein as a "dynamic" estimation method. The preferred dynamic estimation methods belong to the class of linear optimal estimators. The most preferred dynamic estimation method is based on a Kalman filter. This method now will be described in detail.

In-between updates of r and v, mobile unit 10 is assumed to move in a known manner. The model of the motion of mobile unit 10 used herein as an example is linear motion with additive random noise. Other models, such as motion constrained to be along a known road, also may be used. According to the linear model of the motion of mobile unit 10, if the location vector of mobile unit 10 at time $t_{k-1}$ is $r_{k-1}$ and the velocity vector of mobile unit 10 at time $t_{k-1}$ is $v_{k-1}$, then the location and velocity vectors at time $t_k=t_{k-1}+\delta_k$ are $r_k=r_{k-1}+v_{k-1}\delta_k$ and $v_k=v_{k-1}$. The range bias $c_b$ is defined as the difference between the time measured by clock 22 and the GPS clocks, multiplied by the speed of light c, and the range drift $c_d$ is defined as $d(c_b)/dt$. Then $c_{b(k)}=c_{b(k-1)}+c_{d(k-1)}\delta_k$ and $c_{d(k)}=c_{d(k-1)}$. The (eight component) navigation vector n is defined as the concatenation of r, v, $c_b$ and $c_d$: $n=(x,y,z,v_x,v_y,v_z,c_b,c_d)^T$.

The state vector $e=(\delta x,\delta y,\delta z,\delta v_x,\delta v_y,\delta v_z,\delta c_b, \delta c_d)^T$ of the Kalman filter is the estimated navigation error, i.e., the difference between the true navigation vector and the linearly propagated navigation vector. This state vector obeys the propagation equation $$e_k=A_{k-1}e_{k-1}+w_{k-1}$$

where the transition matrix $A_{k-1}$ is:

$$A_{k-1} = \begin{pmatrix} 1 & 0 & 0 & \delta_k & 0 & 0 & 0 & 0 \\ 0 & 1 & 0 & 0 & \delta_k & 0 & 0 & 0 \\ 0 & 0 & 1 & 0 & 0 & \delta_k & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & \delta_k c \\ 0 & 0 & 0 & 0 & 0 & 0 & 0 & 1 \end{pmatrix}$$

and $w_{k-1}$ is the process noise. $w_k$ is defined via the model noise covariance matrix $Q_{k-1}$:

$$Q_{k-1} = w_{k-1}w_{k-1}^T = \begin{pmatrix} RW_x & 0 & 0 & 0 & 0 & 0 & 0 & 0 \\ 0 & RW_y & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & W \end{pmatrix}$$

where $RW_x$ and $RW_y$ are the covariances of the process noise in the x and y directions (note that mobile unit 10 is assumed to move substantially in the (x,y) plane), modeled as random walks, and W is a range drift error covariance, modeled as white noise.

Immediately following an update of the location vector r and of the velocity vector v of mobile unit 10, the state vector e is zero by definition. Subsequently, until the next measurement, as the navigation vector n is propagated forward in time. the covariance of the state vector, and 8×8 matrix P, also is propagated forward in time:

$$P^-_k=AP^+_{k-1}A^T+Q\delta_k$$

Here, superscript "+" refers to the a postiori estimate of P after the most recent update, and the superscript "−" refers to the a priori estimate of P, before the next update. The initialization of P is discussed below.

A measurement obtained from a signal from a satellite 70 is a two component vector, $z=(\rho,d\rho/dt)^T$. The matrix $H_k$ that relates the state vector e to this measurement vector at time $t_k$ is:

$$H_k = \begin{pmatrix} u_x & u_y & u_z & 0 & 0 & 0 & 1 & 0 \\ 0 & 0 & 0 & u_x & u_y & u_z & 0 & 1 \end{pmatrix}$$

where the vector $u=(u_x,u_y,u_z)$ is a unit vector from the estimated location of mobile unit 10 to satellite 70:

$$u \times (r_k-s_k)/|r_k-s_k|$$

$r_k$ is the a priori mobile unit 10 location vector, obtained by forward propagation as described above. $s_k$ is the position vector of satellite 70 at time $t_k$, obtained by GPS processor 20 using the satellite ephemeris and time model of satellite 70.

A measurement obtained from a signal from a BTS 44 is a scalar (a one-component vector), $z=\rho$. The matrix $H_k$ that relates the state vector e to this measurement vector at time $t_k$ is:

$$H_k=(u_x\ u_y\ u_z\ 0\ 0\ 0\ 1\ 0)$$

where the vector $u=(u_x,u_y,u_z)$ is a unit vector from mobile unit 10 to BTS 44. Note that the positions of BTSs 44 are fixed and known.

In both cases, an estimate of e is obtained by multiplying the measurement by the Kalman gain matrix $K_k$:

$$K_k=P^-_k H_k^T(H_k P^-_k H_k^T+R_k)^{-1}$$

$$e=K_k z$$

where the measurement noise covariance matrix $R_k$ is:

$$R_k = \begin{pmatrix} \sigma_\tau^2 & 0 \\ 0 & \sigma_{d\tau/dt}^2 \end{pmatrix}$$

for a satellite measurement and $$R_k=(\sigma_\tau^2)$$

for a BTS measurement. She diagonal elements of $\sigma_k$ are the variances of the corresponding pseudorange and pseudorange rate of change measurement errors. A new a postiori estimate of P is obtained as follows:

$$P^+_k=(I-K_k H_k)P^-_k$$

where I is the unit matrix. Finally, the a postiori navigation vector $n_k^+$ is obtained by adding the state vector e to the a priori navigation vector $n_k$: $x_k^+=x_k+\delta x$, $y_k^+=y_k+\delta y$, $z_k^+=z_k+\delta z$, $v_{xk}^+=v_{xk}+\delta v_x$, $v_{yk}^+=v_{yk}+\delta v_y$, $v_{zk}^+=v_{zk}+\delta v_z$, $c_{bk}^+=c_{bk}+\delta c_b$, and $c_{dk}^+=c_{dk}+\delta c_d$.

Figure 4:
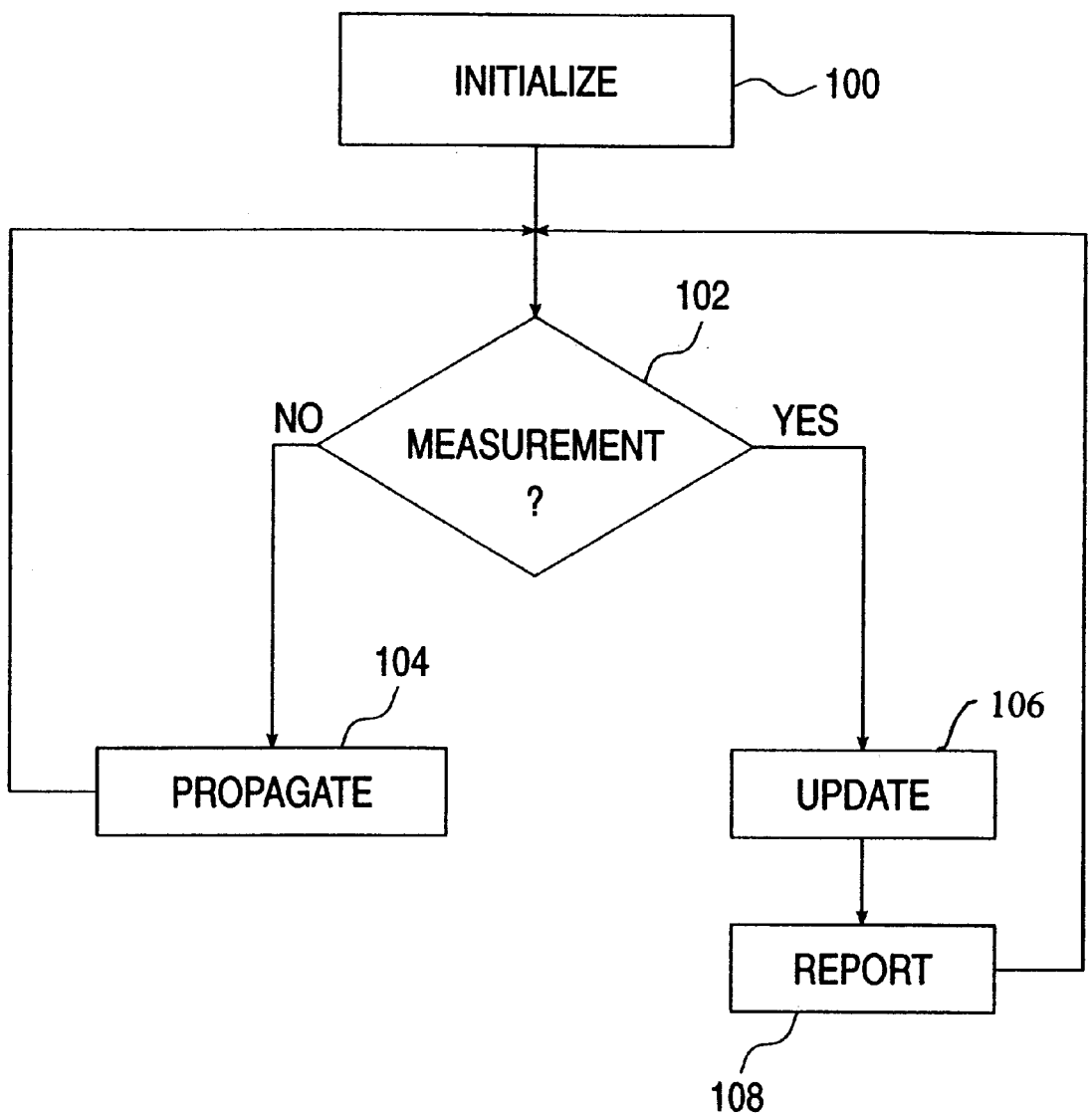
FIG. 4 is a flow chart of the joint estimation of position from satellite pseudoranges, rates of change of satellite pseudoranges and base station pseudoranges.

FIG. 4 is a flow chart of the overall processing effected by joint estimator 30 to track the motion of mobile unit 10. The processing is initialized (block 100) with an initial estimate of the navigation vector n, and by setting the diagonal elements of the covariance matrix P equal to initial values that reflect the initial standard deviations of the errors in r, v, $c_b$ and $c_d$. How the initial estimate of n is obtained is discussed below. In block 102, joint estimator 30 determines whether a measurement vector z has been obtained from (GPS processor 20 or from cellular processor 28. If a measurement has not been obtained, then joint estimator 30 propagates (block 104) the navigation vector n forward in time, as described above. If a measurement has been obtained, then joint estimator uses the Kalman filter described above (block 106) to obtain an a postiori estimate of the navigation vector n. Note that this updating of n is based on a single new measurement, in contrast to the use of a Kalman filter in prior art GPS navigation, in which at least four independent simultaneous measurements are needed. This a postiori estimate is reported (block 108). and joint estimator 30 again checks for a new measurement vector z from GPS processor 20 or from cellular processor 28.

There are several methods by which the initial estimate of the navigation vector n may be obtained. Most simply, a static estimate is used as the initial estimate of r in block 100, and v is initially set to zero. By "static" estimation is meant that the estimation is performed under the assumption that mobile unit 10 did not move while the measurements were made and that the range offset $c_b$ also was stationary while the measurements were made. The simplest "static" estimate of r is the location of a predefined reference point, such as the BTS 44 nearest to mobile unit 10. $c_b$ and $c_d$ also are initialized to zero. This estimate is suitable for use in block 100 of FIG. 4 if the first four measurements are satellite measurements, because the error in using the location of a terrestrial reference point is much smaller than the distances to the satellites. Triangulation is used to combine initial measurements from satellites with initial measurements from BTSs 44, with the proviso that the equation used with a measurement from a BTSs 44 is the full (quadratic) triangulation equation $$|s-r|=\rho-c_b$$

rather than the linearized equation because BTSs 44 are too close to mobile unit 10 to justify linearization of this equation. Mathematical techniques for solving simultaneous quadratic and linear equations are well-known and need not be elaborated here.

Once the tracking of mobile unit 10 has commenced. the processing described above may be made both more accurate and more efficient. For example, the Doppler frequency shifts of the signals $G_j(t)$ may be estimated more accurately. The total Doppler frequency shift is the sum of three terms: the Doppler frequency shift due to the motion of satellite j, the Doppler frequency shift due to the motion of mobile unit 10, and a contribution from the drift of clock 22. The first term can be computed from the ephemeris and time model of satellites j. Mobile unit 10 moves sufficiently slowly that the second term is negligible. The main initial uncertainty in the total Doppler frequency shift lies in the third term; but this term may be inferred from the range drift component $c_d$ of the navigation vector n. It then is possible to obtain an estimate of h, the integer part of the Doppler frequency shift of $G_j(t)$, that is much more accurate than the initial estimate described above. for use in the Doppler compensation factors for matrix $M_{Hj}$. Furthermore, the columns of $M_j$ that are most likely to contain the peak corresponding to $\rho_j$ and $d\rho_j/dt$ can be predicted to within 10 to 20 Hz, as opposed to the 1 KHz range of the full matrix $M_j$, so that only these columns of matrix $M_{Hj}$ need to be produced by the discrete orthogonal transform of matrix $M_{Ij}$.

Alternatively, having computed a pseudorange and a rate of change thereof for one satellite 70, mobile unit estimates the clock drift term of the total Doppler frequency shift by subtracting the computed Doppler frequency shift of the nearest BTS 44 from the apparent Doppler frequency shift that corresponds to the rate of change of the pseudorange to this one satellite 70. This estimated clock drift term is added to the known Doppler frequency shifts due to the motion of the other satellites 70 to provide estimates of the total Doppler frequency shifts of the other satellites 70.

While the invention has been described with respect to a limited number of embodiments, it will be appreciated that many variations, modifications and other applications of the invention may be made.

What is claimed is:

1. A method for locating a mobile unit, comprising the steps of:
   (a) providing a plurality of asynchronous stationary beacons, each said stationary beacon transmitting a respective stationary beacon ranging signal;
   (b) providing a plurality of mobile beacons moving on known respective trajectories, each said mobile beacon transmitting a respective mobile beacon ranging signal, all said mobile beacons being mutually synchronized;
   (c) for each of at least one of said stationary beacons:
      (i) receiving said respective stationary beacon ranging signal, by the mobile unit, and
      (ii) inferring, from said respective stationary beacon ranging signal, at least one parameter related to a range to said each stationary beacon;
   (d) for each of at least one of said mobile beacons:
      (i) receiving said respective mobile beacon ranging signal, by the mobile unit, and
      (ii) inferring, from the respective mobile beacon ranging signal, at least one parameter related to a range to said each mobile beacon;
   (e) synchronizing the mobile unit and said stationary beacons to said mobile beacons by steps including:
      (i) providing, for each said stationary beacon, a reference unit for measuring time offsets between said mobile beacons and said each stationary beacon,
      (ii) measuring said time offsets, by said reference units, and
      (iii) transmitting at least one said time offset from a respective said reference unit to the mobile unit, said inferring of said parameters being based on said synchronization; and
   (f) inferring, from said parameters, a location of the mobile unit.

2. The method of claim 1, wherein said inferring of said parameters and said inferring of said location are effected by the mobile unit.

3. The method of claim 1, wherein said stationary beacons are base stations of a communications system.

4. The method of claim 1, wherein said mobile beacons are satellites.

5. The method of claim 1, wherein said parameters include pseudoranges.

6. The method of claim 5, further comprising the step of:
   (g) for each of said at least one mobile beacon, inferring, from said respective mobile beacon ranging signal, a rate of change of said pseudorange to said each mobile beacon;
   and wherein said parameters that are related to said ranges to said mobile beacons include said rates of change.

7. A method for tracking a mobile unit, comprising the steps of:

(a) providing a plurality of beacons, each said beacon transmitting a respective ranging signal;

(b) obtaining an initial estimate of a location of the mobile unit;

(c) receiving, by the mobile unit, one of said ranging signals;

(d) inferring, from said ranging signal, at least one parameter related to a range to said beacon that transmitted said one ranging signal; and (e) obtaining an updated estimate of said location of the mobile unit, based only on an initial state estimate that includes said initial estimate of said location and on said at least one parameter.

8. The method of claim 7, wherein at least some of said beacons are stationary beacons.

9. The method of claim 8, wherein said stationary beacons are base stations of a communications system.

10. The method of claim 7, wherein at least some of said beacons are mobile beacons moving on known respective trajectories.

11. The method of claim 10, wherein said mobile beacons are satellites.

12. The method of claim 7, wherein said at least one parameter includes a pseudorange.

13. The method of claim 12, wherein said at least one parameter includes a rate of change of said pseudorange.

14. The method of claim 13, wherein said updating is effected using a dynamic estimator.

15. The method of claim 14, wherein said dynamic estimator includes a linear optimal estimator.

16. The method of claim 15, wherein said linear optimal estimator is a Kalman filter.

17. The method of claim 14, wherein said dynamic estimator includes a model of motion of the mobile unit.

18. The method of claim 7, wherein said initial estimate of said location is a location of a predefined reference point.

19. The method of claim 7, wherein said obtaining of said initial estimate of said location is effected by triangulation.

20. The method of claim 7, further comprising the step of:
(f) obtaining an initial estimate of a velocity of the mobile unit; said initial state estimate including said initial estimate of said velocity.

21. A locator system for locating a mobile unit, comprising:

(a) a plurality of asynchronous stationary beacons, each said stationary beacon being operative to transmit a respective stationary beacon ranging signal;

(b) a plurality of mobile beacons, each said mobile beacon operative to transmit a respective mobile beacon ranging signal while moving on a known respective trajectory, all said mobile beacons being mutually synchronized; and (c) in the mobile unit:
(i) a mobile unit clock for producing a mobile unit timing signal;
(ii) a first mobile unit receiver for receiving and digitizing said stationary beacon signals;
(iii) a second mobile unit receiver for receiving and digitizing said mobile beacon signals, thereby producing corresponding digitized mobile beacon signal;
(iv) a memory for storing said digitized mobile beacon signal;
(v) a mobile unit processor for transforming each of said stationary beacon signals into a corresponding stationary beacon pseudorange, and for transforming each of said digitized mobile beacon signals into a corresponding mobile beacon pseudorange subsequent to said storing of said each digitized mobile beacon signal in said memory; and (d) at least one reference unit including:
(i) a first reference receiver for receiving said mobile beacon signals and inferring therefrom a common start time of said mobile beacon signals,
(ii) a second reference unit receiver for receiving at least one of said stationary beacon signals from at least one respective said stationary beacon,
(iii) a reference unit clock for producing a reference unit timing signal,
(iv) a reference unit processor for inferring, for each said at least one respective stationary beacon, a timing offset between a start time of said at least one respective stationary beacon signal and said common start time of said mobile beacon signals; and
(iii) a transmitter for transmitting said at least one timing offset;

said first mobile unit receiver being operative to receive said at least one timing offset from each said at least one reference unit transmitter;

said pseudoranges being with reference to both said mobile unit timing signal and said at least one timing offset.

22. The locator system of claim 21, wherein said mobile unit processor is further operative to transform each said digitized mobile beacon ranging signal into a rate of change of said corresponding mobile beacon pseudorange.

23. The locator system of claim 21, wherein said mobile unit processor is further operative to infer a location of the mobile unit from said pseudoranges.

24. A locator system for locating a mobile unit, comprising:

(a) a plurality of beacons, each said beacon transmitting a respective ranging signal; and (b) in the mobile unit:
(i) a mechanism for obtaining an initial estimate of a location of the mobile unit,
(ii) a receiver for receiving said ranging signals,
(iii) a processor for inferring, from one of said ranging signal, at least one parameter related to a range to said beacon that transmitted said one ranging signal, and
(iv) an updating mechanism for updating said initial location estimate, based only on an initial state estimate that includes said initial location estimate and on said at least one parameter.

25. The locator system of claim 24, wherein at least some of said beacons are stationary.

26. The locator system of claim 25, wherein said stationary beacons are base stations of a communications system.

27. The locator system of claim 26, wherein at least some of said beacons are mobile beacons moving on known respective trajectories.

28. The locator system of claim 27, wherein said mobile beacons are satellites.

29. The locator system of claim 24, wherein said at least one parameter includes a pseudorange.

30. The locator system of claim 29, wherein said at least one parameter includes a rate of change of said pseudorange.

31. The locator system of claim 30, wherein said updating mechanism includes a dynamic estimator.

32. The locator system of claim 31, wherein said dynamic estimator includes a linear optimal estimator.

33. The locator system of claim 32, wherein said linear optimal estimator is a Kalman filter.

34. The locator system of claim 31, wherein said dynamic estimator includes a model of motion of the mobile unit.

35. A method for tracking a mobile unit, comprising the steps of:
(a) providing a plurality of mobile beacons, each said mobile beacon transmitting a respective ranging signal;
(b) providing a plurality of stationary beacons, each said stationary beacon transmitting a respective ranging signal;
(c) obtaining an initial estimate of a location of the mobile unit;
(d) receiving, by the mobile unit, a first said ranging signal from a respective said beacon of one of said pluralities of beacons;
(e) inferring, from said first ranging signal, at least one parameter related to a range to said beacon that transmitted said first ranging signal;
(f) obtaining a first updated estimate of said location of the mobile unit, based only on an initial state estimate that includes said initial location estimate and on said at least one parameter that is related to said range to said beacon that transmitted said first ranging signal;
(g) receiving, by the mobile unit, a second said ranging signal from a respective said beacon of another of said pluralities of beacons;
(h) inferring, from said second ranging signal, at least one parameter related to a range to said beacon that transmitted said second ranging signal; and
(i) obtaining a second updated estimate of said location of the mobile unit, based only on an updated state estimate that includes said first updated location estimate and on said at least one parameter that is related to said range to said beacon that transmitted said second ranging signal.

36. The method of claim 35, wherein said mobile beacons are satellites.

37. The method of claim 35, wherein said stationary beacons are base stations of a communications system.

38. The method of claim 35, wherein, for at least one of said ranging signal said at least one parameter, that is inferred from said at least one ranging signal, includes a pseudorange.

39. The method of claim 35, wherein, for said ranging signal that is received from one of said mobile beacons, said at least one parameter, that is inferred from said ranging signal, includes a pseudorange and a rate of change of said pseudorange.

40. The method of claim 35, wherein said updating is effected using a dynamic estimator.

41. The method of claim 40, wherein said dynamic estimator includes a linear optimal estimator.

42. The method of claim 41, wherein said linear optimal estimator is a Kalman filter.

43. The method of claim 41, wherein said dynamic estimator includes a model of motion of the mobile unit.

44. The method of claim 35, wherein said initial estimate of said location is a location of a predefined reference point.

45. The method of claim 44, wherein said predefined reference point is a location of one of said stationary beacons.

46. The method of claim 35, wherein said obtaining of said initial estimate of said location is effected by triangulation.

47. A locator system for locating a mobile unit, comprising:
(a) a plurality of mobile beacons, each said mobile beacon transmitting a respective ranging signal;
(b) a plurality of stationary beacons, each said stationary beacon transmitting a respective ranging signal; and
(c) in the mobile unit:
(i) a mechanism for obtaining an initial estimate of a location of the mobile unit,
(ii) a receiver for receiving said ranging signals,
(iii) a processor for inferring, from each of said ranging signals, at least one parameter related to a range to said beacon that transmitted said each ranging signal, and
(iv) an updating mechanism for updating said initial location estimate, using only;
(A) an initial state estimate that includes said initial location estimate, and
(B) said at least one parameter that is related to said range to a beacon of one of said pluralities of beacons,
thereby providing a first updated location estimate of said location of the mobile unit, and for updating said first updated estimate, using only:
(A) an updated state estimate that includes said first updated location estimate, and
(B) said at least one parameter that is related to said range to a beacon of another of said pluralities of beacons.

48. The locator system of claim 47, wherein said mobile beacons are satellites.

49. The locator system of claim 47, wherein said stationary beacons are base stations of a communications system.

50. The locator system of claim 47, wherein each said at least one parameter includes a pseudorange.

51. The locator system of claim 47, wherein, for each said ranging signal that is received from one of said mobile beacons, said at least one parameter, that is inferred from said each ranging signal, includes a pseudorange and a rate of change of said pseudorange.

52. The locator system of claim 47, wherein said updating mechanism includes a dynamic estimator.

53. The locator system of claim 52, wherein said dynamic estimator includes a linear optimal estimator.

54. The locator system of claim 53, wherein said linear optimal estimator is a Kalman filter.

55. The locator system of claim 52, wherein said dynamic estimator includes a model of motion of the mobile unit.

* * * * *